United States Patent

[11] 3,631,677

| [72] | Inventor | Raymond L. Williams |
| | | Cincinnati, Ohio |
| [21] | Appl. No. | 19,593 |
| [22] | Filed | Mar. 16, 1970 |
| [45] | Patented | Jan. 4, 1972 |
| [73] | Assignee | General Electric Company |

[54] COMPRESSOR DISCHARGE PRESSURE COMPUTER
12 Claims, 7 Drawing Figs.

[52] U.S. Cl. .................................................. 60/243,
60/39.28, 91/358, 91/385
[51] Int. Cl. ...................................................... F02k 3/10
[50] Field of Search ............................................ 60/39.28

[56] References Cited
UNITED STATES PATENTS

| 3,402,556 | 9/1968 | Lavash | 60/39.28 X |
| 3,034,570 | 5/1962 | Carmon | 60/39.28 |
| 2,958,190 | 11/1960 | Rogers | 60/39.28 |
| 3,167,082 | 1/1965 | Oliphant | 60/39.28 X |
| 3,063,239 | 11/1962 | Jensen | 60/39.28 |
| 3,067,580 | 12/1962 | Kast | 60/39.28 |
| 3,243,955 | 4/1966 | Frank | 60/39.28 X |
| 3,394,721 | 7/1968 | Ifield | 60/39.28 UX |

*Primary Examiner*—Clarence R. Gordon
*Attorneys*—Derek P. Lawrence, Thomas J. Bird, Jr., Lee H. Sachs, Frank L. Neuhauser, Oscar B. Waddell and Joseph B. Forman

ABSTRACT: A servomechanism or pressure computer is shown which utilizes the jet nozzle servo principle. An input shaft is positioned for slight rotational movement within a sealed housing with the rotational position of the input shaft controlling the ultimate position of a jet nozzle which delivers servo fuel to either end of a power piston. Torque inputs are provided to the input shaft by a single input bellows, which operates against an evacuated bellows, and by a feedback spring which is connected to one end of the power piston. The servo jet nozzle is completely sealed with respect to the remainder of the servomechanism housing thereby preventing servo jet fuel from reaching the remainder of the mechanism. In operation, an input pressure is sensed by the bellows and thereby causes rotation of the input shaft and subsequent movement of the jet nozzle which repositions the power piston to a point wherein the feedback force generated through the feedback spring equals the input force generated by the bellows. The position of the power piston may be utilized to control any parameter, and in one embodiment, is utilized to control fuel delivery to an augmenter fuel system of an aircraft gas turbine engine.

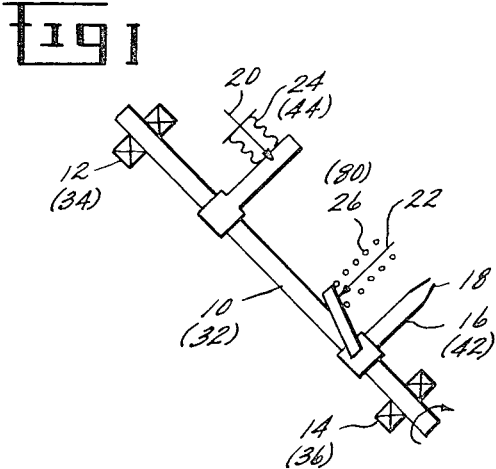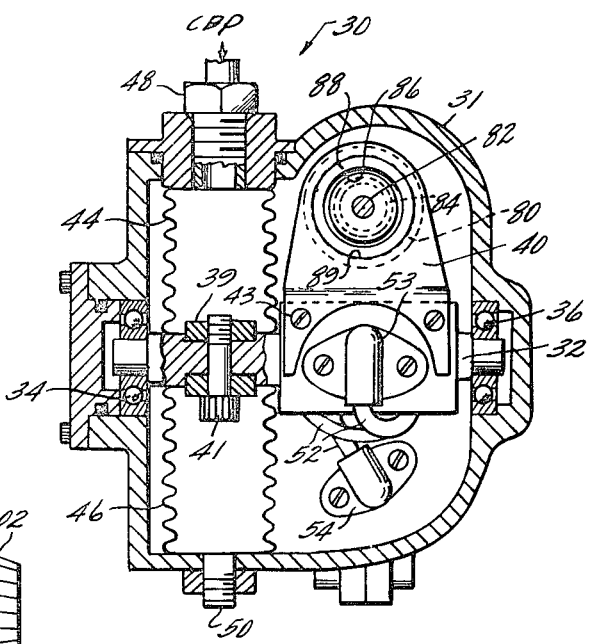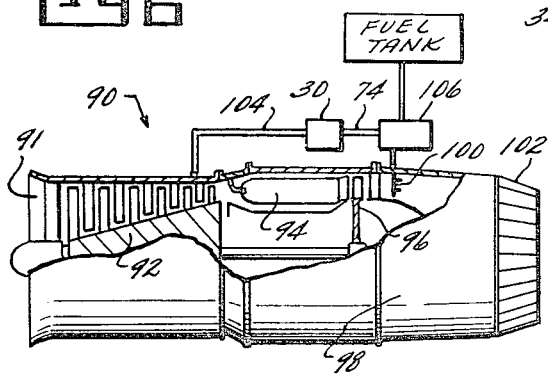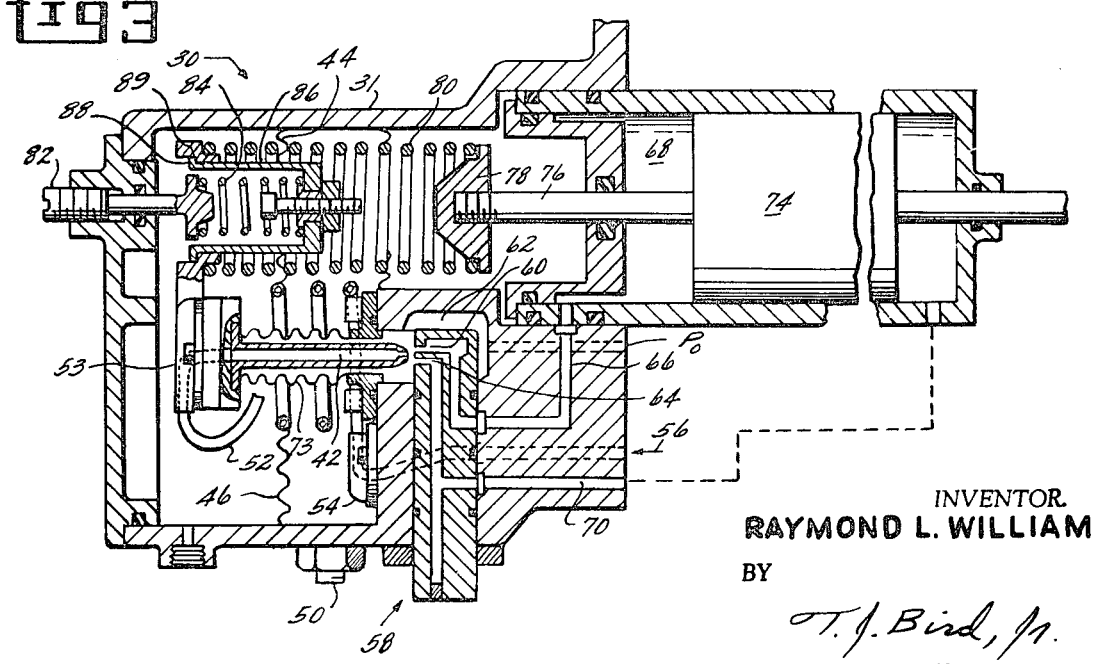
INVENTOR.
RAYMOND L. WILLIAMS
BY
T. J. Bird, Jr.
AGENT

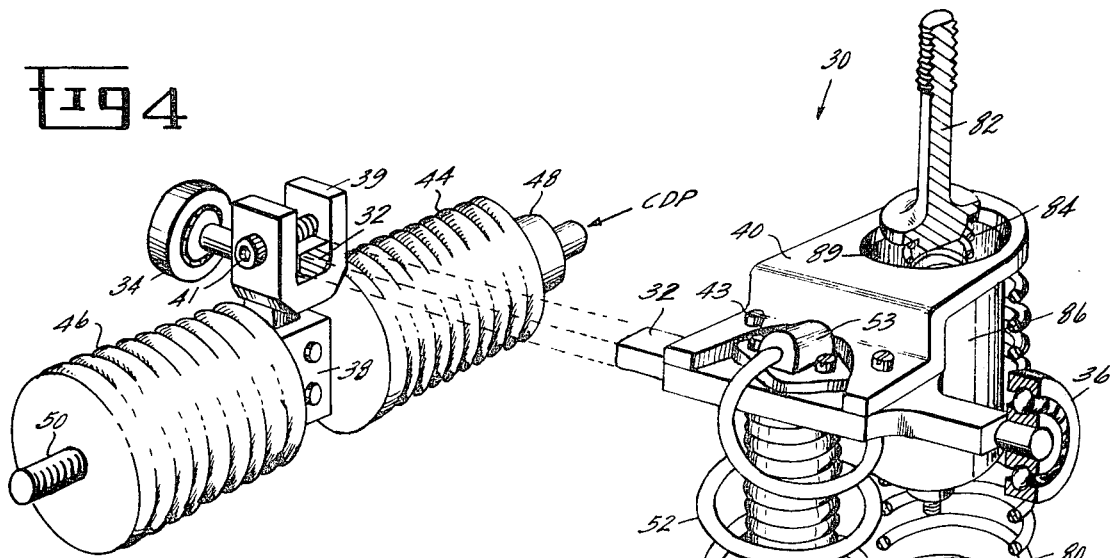
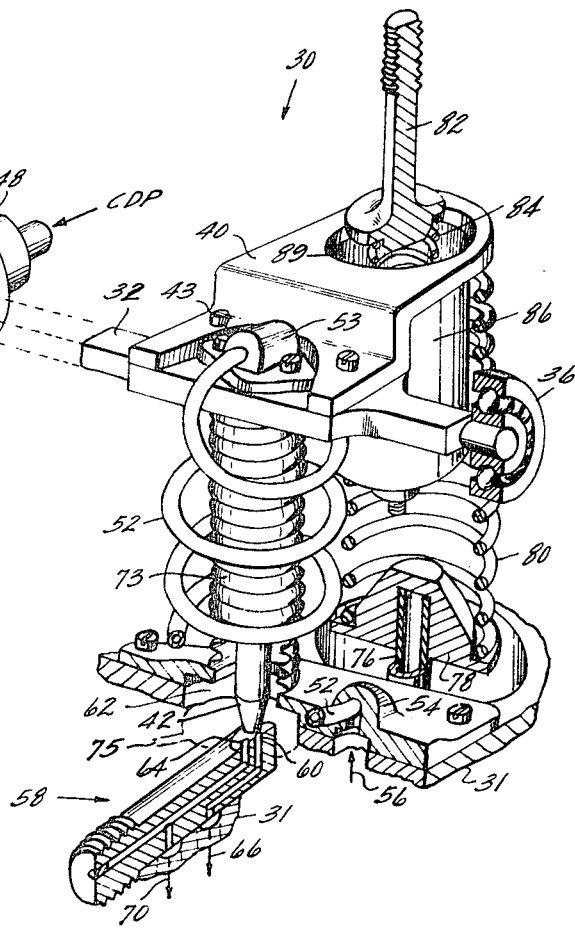
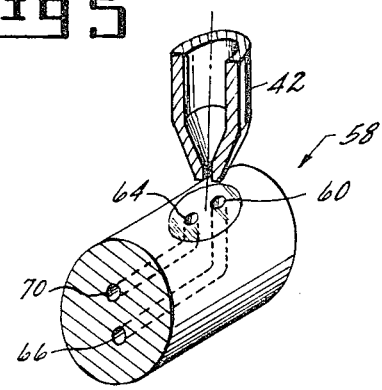
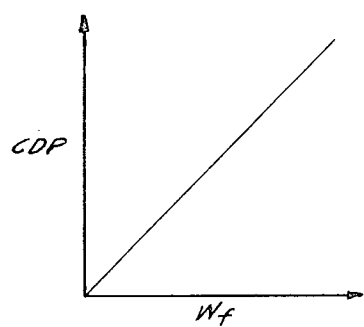
INVENTOR.
RAYMOND L. WILLIAMS

COMPRESSOR DISCHARGE PRESSURE COMPUTER

The invention described and claimed in the U.S. patent application herein resulted from work done under U.S. Government contract FA-SS-67-7. The U.S. Government has an irrevocable, nonexclusive license under said application to practice and have practiced the invention claimed herein, including the unlimited right to sublicense others to practice and have practiced the claimed invention for any purpose whatsoever.

BACKGROUND OF THE INVENTION

This invention relates generally to servomechanisms and, more particularly to a servomechanism or pressure computer for sensing the discharge pressure of a gas turbine compressor and for providing a control signal proportional to said discharge pressure. The servomechanism produces an output movement to a hydraulically operated piston or actuator proportional to the discharge pressure of the compressor. Such an actuator is then used, for example, to position various movable control devices associated with the gas turbine engine, such as a variable area nozzle, variable area vanes, main combustion fuel flow, or augmenter combustion fuel flow.

Conventional turbojet engines manufactured today comprise a compressor, a combustion system, a turbine, a tailpipe, and a variable area exhaust nozzle. As is generally known, air enters an inlet and is compressed in the compressor, ignited along with high-energy fuel in the primary combustion system, performs work while expanding through the turbine and finally exits through the exhaust nozzle whereby its high energy provides forward thrust to an aircraft powered by the engine. For a short-time, high-thrust requirement, an augmenter combustion system may be positioned within the tailpipe wherein additional fuel is provided and burned within the tailpipe prior to exiting through the exhaust nozzle.

Many of the operating parameters of conventional turbojet engines depend upon the pressure of the gas emanating from the compressor. For example, the amount of fuel delivered to the main combustion system and the amount of fuel delivered to the augmenter combustion system are at times made dependent upon the pressure of air leaving the compressor. For this reason, it is desirable to provide a lightweight, simple, and reliable sensing device for computing the actual compressor discharge pressure and for providing a control signal to modulate any of the above-mentioned parameters.

SUMMARY OF THE INVENTION

It is an object of the present invention, therefore, to provide a simple, lightweight, and reliable servomechanism for computing compressor discharge pressure and for controlling an operating parameter thereby.

Briefly stated, the object of this invention is carried out by a servomechanism which uses the jet nozzle servo principle with fuel as its operating medium. An input shaft within the mechanism controls the position of a jet nozzle which delivers fuel to either end of a power piston. Torque inputs to the input shaft are provided by a bellows, which senses compressor discharge pressure, and by a feedback force generated through a spring connected to one end of the power piston. The servomechanism operates as a force-balanced system when in the steady-state condition in that the input force (compressor discharge pressure) is equal and opposite to the feedback force generated by the spring. A change in compressor discharge pressure causes rotation of the input shaft and movement of the jet nozzle which thereby repositions the power piston to a point wherein the feedback force again equals the input force. The position of the piston may, of course, be utilized to control any operating parameter of the gas turbine engine.

DESCRIPTION OF THE DRAWINGS

While the specification concludes with a series of claims which particularly point out and distinctly claim the subject matter which the applicant regards as his invention, as understanding of the invention may be gained from the following detailed description of a preferred embodiment which is given in light of the accompanying drawings, in which:

FIG. 1 is a schematic view showing the operating forces associated with applicant's servomechanism;

FIG. 2 is an end plan view, with portions deleted, of a servomechanism constructed in accordance with this invention;

FIG. 3 is a right side view, taken partly in section, of the servomechanism of FIG. 2;

FIG. 4 is a perspective view, with portions removed, of the servomechanism of FIG. 2;

FIG. 5 is an enlarged portion of FIG. 4;

FIG. 6 is a schematic view of a gas turbine engine utilizing the servomechanism of this invention; and FIG. 7 is a plot of the operating parameters obtained from use of the servomechanism as shown in FIG. 6.

DESCRIPTION OF A PREFERRED EMBODIMENT

Referring now to the drawings wherein like numerals correspond to like elements throughout, the general operating characteristics of applicant's servomechanism are shown schematically in FIG. 1. As pictured therein, an input shaft 10 is positioned for rotation within a pair of bearings 12 and 14. Coupled to the input shaft 10 for rotation therewith is a servo jet nozzle 16 which provides servo fluid through a nozzle outlet 18 to a servo receiver (not shown), which delivers the same to an element, the position of which is desired to be controlled.

As further shown in FIG. 1, there are two forces which control the rotational position of the input shaft 10. An input force, generally designated by the numeral 20, is applied to the input shaft 10 in such a manner as to cause clockwise rotation thereof; and a feedback force, generally designated by the arrow 22, is connected to the input shaft 10 in such a manner as to cause counterclockwise rotation thereof. It can be seen from the schematic that the arithmetic sum of the input force 20 and the feedback force 22 will control the ultimate rotational position of the input shaft 10, which in turn controls the position of the jet nozzle 16 and its associated outlet 18. As further shown, the input force 20 is produced by means of the expansion of a pressure-sensitive bellows 24, while the feedback force is produced by means of a feedback spring 26.

The manner in which the input force 20 and the feedback force 22 are imposed upon the input shaft 10 will presently be discussed, with reference being made to FIGS. 2 through 5 wherein a servo actuator constructed in accordance with this invention is generally designated by the numeral 30. The servomechanism 30 includes a housing 31 for supporting an input shaft 32 positioned within a pair of bearings 34 and 36 (FIG. 2). The input shaft 32 is actually a flat plate member provided with cylindrical ends so as to be capable of rotational motion of approximately plus or minus 2°.

Connected to opposite sides of the flat plate portion of the input shaft 32, as clearly shown in FIG. 4, are an arm 38 and a feedback lever 40. The arm 38 includes a U-shaped member 39 which surrounds the shaft 32 and is connected thereto by any suitable means such as a bolt 41, while the feedback lever 40 is cantilevered to the shaft 32 by means of bolts 43. As shown most clearly in FIGS. 3 and 4, a servo jet nozzle 42 is also connected to the input shaft 32 at the same location as the feedback lever 40. The detailed operation of the servo jet nozzle 42 will be described subsequently. Suffice it to say at this time that the servo jet nozzle 42 is positioned such that rotation of the input shaft 32 causes movement of the nozzle 42.

As previously mentioned, the arm 38 consists of a small flat plate member having the U-shaped end 39 attached to the input shaft 32 as shown in FIG. 4. The flat plate portion of the arm 38 has connected in fluidically sealed relationship to a first side thereof a first expandable bellows 44, and similarly connected to a second side thereof, a second bellows 46. The first bellows 44 is provided with a source of pressurized air (not shown) by means of a fitting 48, while the second bellows 46 is evacuated of all air by means of a fitting 50. The fittings 48 and 50 of the bellows 44 and 46 are connected to the housing 31 as shown in FIG. 2. It should be readily apparent that an increase in pressure within the first bellows 44 will cause the flat plate portion of the arm 38 to move slightly to the left (FIG. 4) thus causing a slight clockwise rotation to the input shaft 32.

The servo jet nozzle 42, which extends through the shaft 32, is provided with a suitable servo fluid by means of a coiled servo supply tube 52. One end of the coiled tube 52 is connected to a fitting 53 which surrounds that portion of the nozzle 42 which extends through the input shaft 32, while the opposite end of the coil tube 52 is connected to a fitting 54 located within and connected to the housing 31. The fitting 54 includes an inlet 56 which has connected thereto a suitable supply of servo fluid (not shown). The coiled shape of the tube 52 allows for flexing thereof during the small amount of rotation associated with the input shaft 32.

Referring now to FIGS. 3-5, the outlet of the servo jet nozzle 42 is positioned opposite a servo jet receiver 58, which fits within a hollow chamber 62 formed in the housing 31 and includes two receiver ports 60 and 64. The receiver port 60 is connected by means of a tube 66 to the rod end of a piston chamber 68, while the receiver port 64 is connected the head end of the piston chamber 68 by means of a drilled channel 70.

As shown in FIGS. 3 and 4, the servo jet nozzle 42 is surrounded by a servo discharge bellows 73, which is attached in a sealed manner on one end to the input shaft 32 and on its opposite end to the fitting 54. The servo discharge bellows 73 cooperates with the hollow chamber 62 formed in the housing 31 to define a reservoir for receiving the servo fluid from the servo jet nozzle 42 which does not enter either of the receiver ports 60 and 64. This fluid is then exhausted to drain through a servo exhaust 75. In this manner, the servo fluid is prevented from reaching the remainder of the interior of the housing 31. The servomechanism 30 is thus capable of operating in an ambient air medium rather than a fuel medium. This increases the accuracy and reliability of the device as it eliminates the possibility of contaminated servo fuel coming into contact with most of the operating components of the mechanism.

The piston chamber 68 has positioned for reciprocal movement therein a piston 74. From the above description, it can be seen that the position of the piston 74 is controlled by the amount of servo fluid which enters the ports 60 and 64. Extending from the piston 74 at one end thereof is a piston rod 76 which is fitted with a cap 78 at its free end. The cap 78 supports one end of a feedback spring 80, the opposite end of which is supported by the free end of the feedback lever 40. Thus, movement of the piston 74 will ultimately cause movement of the feedback lever 40, with the extent of the movement depending upon the spring gradient of the feedback spring 80.

As most clearly shown in FIG. 3, the actual position of the feedback lever 40 can be adjusted by means of rotation of a balance spring adjustment mechanism 82. Rotation of the adjustment mechanism 82 causes compression of a balance spring 84 which is positioned within a hollow cylindrical cup 86 having an overturned lip 88 (FIG. 3) which fits within an opening 89 located within the feedback lever 40. Compression of the adjustment spring 84 causes slight axial movement of the cup 86 which, in turn, causes slight movement of the free end of the feedback lever 40.

Referring briefly to FIG. 1, it can be seen that the input force provided by the pressure within the bellows 44 has been previously schematically represented as the arrow 20; while the feedback force provided by the position of the piston 74 through the feedback spring 80 and the feedback lever 40 has been previously denoted by the arrow 22. The input shaft 32 has previously been denoted by the shaft 10. From this schematic, the operation of the servomechanism 30 should be readily apparent.

In operation, the servomechanism 30 acts as a force-balanced system when in the steady state condition. That is, the net force acting upon the input shaft 32 is zero during steady-state operation; the servo jet nozzle 42 is located in a "null position" such that all servo fluid is directed to a location intermediate the receiver ports 60 and 64 and exits through the drain 75. The piston 74 thus remains fixed in its previously scheduled position.

During transient operation, however, the net force on the input shaft 32 is not zero and servo fluid enters either into port 60 or 64. Suppose, for example, the pressure within the bellows 44 should increase for any reason. The arm 38 would thus move slightly to the left (FIG. 4), thus causing small clockwise rotation of the input shaft 32. The servo jet nozzle 42 will move with the shaft 32 in a direction to cause an increase in the flow to the receiver port 64. This increased flow will pass through the channel 70 to the head end of the piston chamber 68, thereby causing the piston 74 to move towards the left (FIG. 3) for some distance. This left-hand movement of the piston 74 will cause an increase in the compression of the feedback spring 80 and will thus cause a slight leftward movement of the free end of the feedback lever 40. This, in turn, will cause a slight counterclockwise rotation of the input shaft 32. The counterclockwise rotation of the input shaft 32 will cause the servo jet nozzle 42 to move back toward a centered position (null) between ports 60 and 64, and will thus rebalance the system. This series of events has thus created a rebalancing of forces around the input shaft 32 with the servo jet nozzle 42 again being located at its null position but with the piston 74 being located at a different position due to the increase in pressure within the bellows 44.

Should the pressure within the bellows 44 decrease, the opposite of the above will happen. The system will again null out with the servo jet nozzle 42 at its null position but with a lower torque level on the input shaft 32 and with the piston 74 being located at a position somewhat to the right of its original position.

As previously mentioned, the position of the piston 74 may be utilized to control any operating parameter. As a specific example, reference will now be made to FIG. 6 wherein the servomechanism 30 is shown as controlling augmenter fuel flow for a gas turbine engine 90. The engine 90 includes an inlet 91, a compressor 92, a primary combustion system 94, a turbine 96, a tailpipe 98, an augmenter combustion system 100, and a variable area exhaust nozzle 102. As is well known, air enters the inlet 91 and is compressed in the compressor 92, ignited along with the high-energy fuel in the primary combustion system 94, performs work while expanding through the turbine 96, and finally exits through the exhaust nozzle 102 whereby its high energy provides forward thrust to an aircraft powered thereby. In some applications, such as take off for a supersonic aircraft, additional fuel is provided to the augmenter combustion system 100 and is ignited in the tailpipe 98 to provide additional thrust.

In the present application it is proposed to control the amount of fuel delivered to the augmenter combustion system 100 as a function of the pressure of the gas discharging from the compressor 92. More exactly, it is proposed to schedule augmenter fuel flow ($W_f$) as a linear function of compressor discharge pressure (CDP), as shown in FIG. 7.

In light of the above, the bellows 44 of the servomechanism 30 is connected by means of the fitting 48 and a pipe 104 to the outlet end of the compressor 92. The piston 74 is connected directly to an augmenter fuel valve, shown schematically as 106. An increase in compressor discharge pressure, as sensed by the bellows 44, will ultimately result in repositioning of the piston 74, as previously discussed, which repositioning can be utilized to schedule suitable openings (not shown) in the fuel valve 106 for the delivery fuel to the augmenter combustion system 100. The compressor discharge pressure thus operates as one of the controlling factors in determining the amount of fuel delivered to the augmenter fuel system of the gas turbine engine. In this system, augmenter fuel may be utilized as the servo fluid delivered to the servo fluid inlet 56.

It can be seen from the above description that applicant has provided a simple, lightweight, and extremely reliable servomechanism which positions a power piston as a function of one input pressure. The servomechanism is capable of miniaturization and eliminates the necessity of any sliding seals or sliding parts at the sensitive input portion thereof which would create friction and thus cause loss of accuracy within the servomechanism.

The servomechanism 30 is capable of operation with sufficient accuracy even in the event of the failure of the bellows 44. That is, should the bellows 44 fail for any reason, the input pressure through the fitting 48 would flood the housing 31 and this pressure would continue to act against the evacuated bellows 46 and would thus create the same input force as was previously created by the unfailed bellows 44. Additionally, with the bellows 44 and 46 being located within that portion of the housing which is sealed from the servo fuel by means of the servo discharge bellows 73, a bellows failure will not permit servo fuel to leak back into an aircraft gas turbine engine compressor section when the servomechanism 30 is utilized as a compressor discharge pressure computer as described above. Furthermore, the servo supply tube 52 is designed and located in a manner such that servo fuel pressure level changes or thermal coefficient of expansion changes do not add force changes (and thus schedule errors) into the system.

It should be obvious that slight changes and modifications could be made in the servomechanism which has been described without departing from the broader inventive concepts disclosed by the applicant. In light of this, the appended claims are intended to cover all such modifications as fall within the true scope of applicant's invention.

I claim:

1. A compressor discharge pressure computer for positioning a piston in response to a compressor discharge pressure, said computer comprising:
   an input shaft rotatably supported by bearing means;
   pressure-actuated transducer means responsive to said compressor discharge pressure to move said input shaft;
   feedback transducer means responsive to the position of said piston to move said input shaft in a direction opposite that caused by said pressure-actuated transducer means.
   a torque-controlled servo valve for regulating the flow of servo fluid from a source of said fluid to said piston in proportion to a torque input to said input shaft;
   said torque-controlled servo valve including a coiled servo supply tube having an end connected to said input shaft, a servo jet nozzle fluidically connected to said supply tube, said servo jet nozzle extending through and radially from said input shaft such that slight rotational movement of said shaft causes relatively large displacement of said servo jet nozzle; and
   a servo fluid receiver having a plurality of receiver ports, one of said ports being fluidically connected to one end of said piston, and a second of said ports being fluidically connected to the opposite end of said piston.

2. A computer as recited in claim 1 wherein said pressure-actuated transducer means comprises a first inflatable bellows, a second inflatable bellows axially aligned with said first bellows, an arm interposed between said first and second bellows, said arm being connected at one end thereof to the peripheral surface of said input shaft whereby movement of said arm caused by a pressure change in said first bellows causes slight rotation of said input shaft.

3. A pressure computer as recited in claim 2 further comprising means for preventing said servo fluid from coming into contact with said pressure-actuated transducer means.

4. A pressure computer as recited in claim 3 wherein said prevention means include a flexible discharge bellows which surrounds said servo jet nozzle.

5. A pressure computer as recited in claim 4 further comprising a hollow chamber for enclosing said fluid receiver, said chamber and said discharge bellows forming a reservoir for discharged servo fluid.

6. A computer as recited in claim 5 wherein rotation of said input shaft causes servo fluid to be delivered to either said first or said second receiver port thereby causing axial movement of said piston.

7. A computer as recited in claim 6 wherein said feedback transducer means comprises a feedback lever cantilevered at one end thereof to the peripheral surface of said input shaft and a feedback spring interposed between said piston and said feedback lever such that axial movement of said piston exerts a force on said feedback lever which causes rotation of said input shaft.

8. A computer as recited in claim 7 wherein said feedback lever is connected to the peripheral surface of said input shaft approximately 180° opposite from the connection of said arm to said input shaft.

9. A computer as recited in claim 8 further including means for adjusting the position of said feedback lever.

10. A computer as recited in claim 9 wherein said adjustment means comprise a hollow cup having a portion thereof connected to said feedback lever, an adjustment spring positioned within said cup, and means for compressing said adjustment spring whereby movement is imparted to said cup.

11. A computer as recited in claim 10 wherein said cup is positioned within one end of said feedback spring.

12. A servo actuator for controlling augmenter fuel flow in a gas turbine engine as a function of the pressure of air discharging from the compressor of said gas turbine engine, said servo actuator comprising:
    an input shaft rotatably supported by bearing means;
    pressure-actuated transducer means responsive to said compressor discharge pressure signal to rotate said input shaft;
    a piston;
    feedback transducer means responsive to the position of said piston to rotate said input shaft in a direction opposite to that caused by said pressure-actuated transducer means;
    a torque-controlled servo valve for regulating the flow of servo fluid from a source of said fluid to said piston in proportion to a torque input upon said input shaft;
    said torque-controlled servo valve including a coiled servo supply tube having an end extending through said input shaft, a servo jet nozzle fluidically connected to said tube, said servo jet nozzle extending from said input shaft;
    a servo fluid receiver including a plurality of receiver ports for receiving said servo jet fluid from said servo jet nozzle;
    said torque input to said input shaft comprising the arithmetic sum of said pressure-actuated transducer input and said feedback transducer input; and
    said piston position controlling the amount of fuel delivered to said augmenter.

* * * * *